Feb. 6, 1934.  M. LILIENTHAL ET AL  1,946,289
MULTIPLE SPEED MOTOR
Filed Dec. 16, 1931

Inventors:
Max Lilienthal,
Lothar Michaelis,
by Charles E. Tullar
Their Attorney.

Patented Feb. 6, 1934

1,946,289

UNITED STATES PATENT OFFICE 1,946,289

MULTIPLE SPEED MOTOR

Max Lilienthal, Berlin-Wilmersdorf, and Lothar Michaelis, Berlin-Charl, Germany, assignors to General Electric Company, a corporation of New York Application December 16, 1931, Serial No. 581,426, and in Germany December 31, 1930

10 Claims. (Cl. 172—275)

Our invention relates to multiple speed motors, and in particular to two speed synchronous motors of the small variety commonly employed as timing devices. The object of our invention is to provide such a motor in which the speed may be quickly changed from one speed to another.

Small synchronous motors are often employed for driving charts of recording instruments, and in some applications it becomes desirable quickly to increase the chart speed in response to some overload or other emergency condition of the quantity being recorded, in order to obtain a greater distribution and, therefore, a more accurate record of such conditions. United States Patent No. 1,545,078, Angus, describes a scheme for accomplishing this purpose, employing two separate driving motors for the recording chart. Our double speed synchronous motor may be employed for this purpose with an appreciable reduction in the cost as compared to the apparatus described in the patent referred to above. Other uses for the motor of our invention will occur to those skilled in the art, and the particular speed ratio to be selected for the motor may be varied, and will, of course, depend upon the use for which the motor is to be used.

In carrying our invention into effect, we may make either the primary or the secondary element of the motor as a double element arranged for different synchronous speeds with selective means for shifting the motor action from one part to another part of the double element so as to change the speed.

The features of the invention which are believed to be new and patentable will be pointed out in the claims appended hereto. For a better understanding of the invention reference is made in the following description to the accompanying drawing showing two forms of the invention. The form shown in Fig. 1 has a double element secondary rotor with a single stator primary element arranged to be shifted to influence and cooperate with one or the other of the rotor elements. The form of the invention shown in Fig. 2 has two stator field elements which selectively operate on different portions of an induction disc rotor provided with two sets of salient poles, the number of poles in the different sets being selected in accordance with the speed ratio desired.

Figure 1:
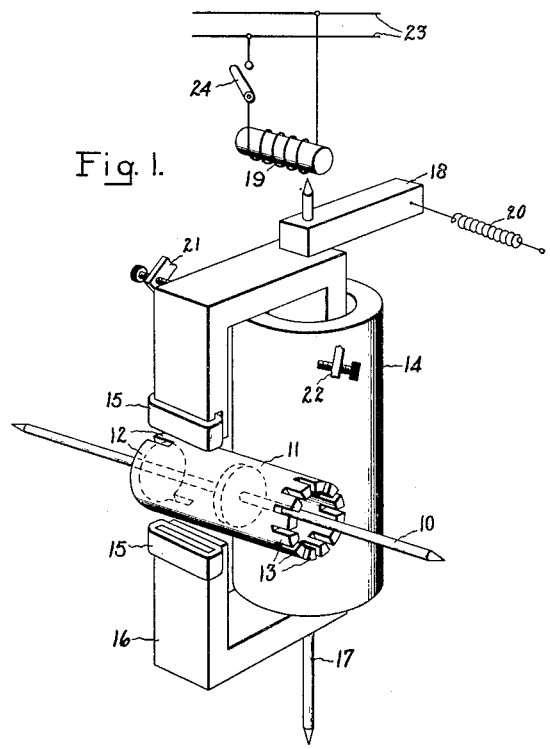

Referring now to Fig. 1, we have represented a secondary rotor supported on shaft 10, the rotor having a continuous cylindrical central portion 11 with sets of teeth cut in either end. The slots in the left-hand end of the cylinder form two poles 12, and those in the opposite end form twelve salient poles 13. We may make the entire cylinder out of the same material, such as iron, and may harden the toothed end portions by tempering, leaving the central portion soft. The continuous end portions of the cylinder serve as the secondaries of an induction motor, while the salient poles serve as the secondaries of synchronous motors to establish synchronous speeds dependent upon the number of salient poles in each set. The stator is an ordinary single phase shaded pole field element, with an exciting winding 14 and shading coils 15 mounted on the core member 16. This stator element of the motor mechanism is mounted on a shaft 17 in such manner that its pole pieces may be swung from one end of the cylindrical rotor to the other to operate upon either set of the axially displaced salient rotor poles. When opposite the two pole end of the rotor as represented in the drawing, the rotor portion within the influence of the field cooperates with the shifting flux alternations of the stator to form a self-starting synchronous motor, the synchronous speed of which on 60 cycles will be 3600 R. P. M. When the stator is shifted so that its pole pieces are opposite the twelve pole end of the rotor the flux takes a different path through the rotor and we have a self-starting synchronous motor having a synchronous speed of 600 R. P. M.

The desired induction motor action for bringing the rotor to the higher speed will be greater than for the lower speed, and this action may be suitably proportioned by modifying the conductivity of the continuous portion of the cylinder adjacent its two ends, or the induction motor action at the low speed end may be reduced in proportion to that at the other end by allowing the stator to swing further out so as to have less influence on the continuous end portion of the rotor when in the low speed position.

For shifting the stator, and thus selecting the synchronous speed, we provide a relay comprising an armature 18 and a core and coil 19. When the coil is sufficiently deenergized, a spring 20 holds the stator at the high speed end of the rotor against an adjustable stop 21. When the relay is fully energized it pulls the armature 18 and rotates the stator assembly about axis 17 against an adjustable stop 22 with its field poles opposing the low speed end of the rotor.

We may assume that the motor is intended to drive the chart of a recording instrument (not shown), which instrument records some condition such as the current in a load circuit represented at 23. The relay 19 is connected across this circuit through a switch 24, and with normal voltage on circuit 23 and the motor field 14 energized we may quickly change the synchronous speed of the motor at will by opening and closing switch 24. Under normal conditions slow speed will be desired, and the switch 24 will, therefore, be closed. When a serious overload condition on circuit 23 occurs, such as may be caused by a short circuit, for example, it will be desirable to speed up the record sheet so as to be able to more accurately record the rapid fluctuations of the current. Relay 19 is so proportioned with respect to the strength of spring 26 that a serious drop in voltage on line 23, such as will be caused by a short circuit condition, will release the armature 18 and shift the motor over to high speed operation. It will, of course, be apparent that any other way of accomplishing a relative shift of the stator and rotor to bring the two ends of the rotor alternately within the influence of the stator field may be employed.

Figure 2:
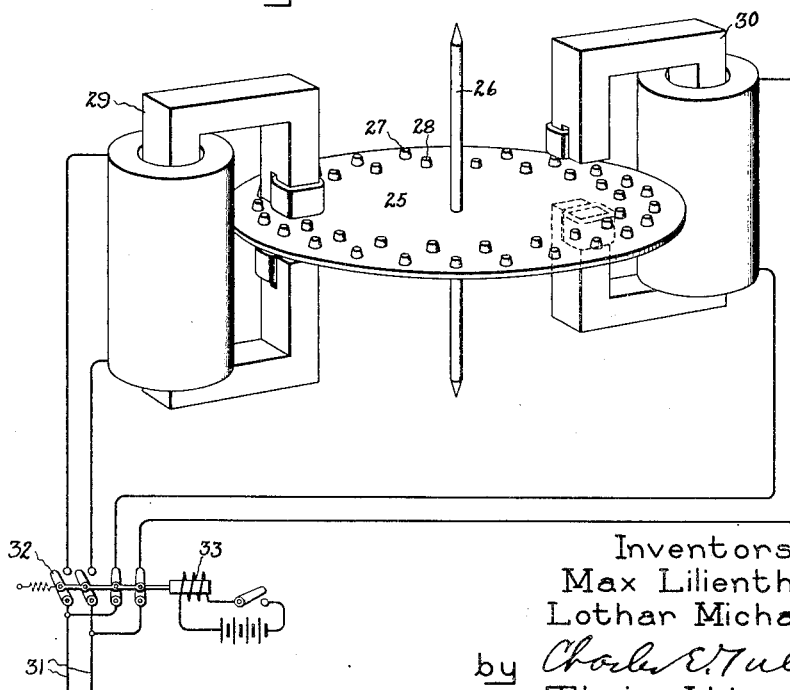

In Fig. 2, we have represented an induction disc rotor 25 rotatable with shaft 26 and provided with two circular and concentric rows of magnetic inserts on pole pieces 27 and 28 located at different radial distances from the axis of rotation. The outer row 27 contains more pole pieces than the inner row 28. Opposite the outer row of pole pieces we provide a shaded pole stator element 29, which when energized causes the disc to rotate by induction motor action, which action is synchronized at a predetermined speed by reason of the number and spacing of the pins in the outer row 27. A second stator element 30 has its shaded pole pieces embracing the disc opposite the inner row of poles 28, and when energized causes similar action but synchronizes at a higher synchronous speed dependent upon the number of pins in the inner row. Both stator elements are adapted to be alternately energized from a single phase source, represented at 31, through the two-way switch 32, which switch may be remote controlled as desired by relay 33.

The drawing represents stator element 30 connected for the higher speed operation, and a lower speed may be obtained by energizing relay 33 so as to close the circuit to stator 29 and open that to stator 30. In the modification of Fig. 2, low speed operation may be in one direction and high speed in the opposite direction, depending upon the relative positions of the shading coils on the two stators. As represented, the two speeds of operation will be in a counterclockwise direction.

Additional circular rows of pole pieces and additional stator elements located opposite such additional rows of pole pieces might be added to Fig. 2 to increase the number of synchronous speeds. Also, we might employ only one stator element and shift it from one set of rotor poles to another, as in Fig. 1.

Such other modifications as do not depart from the true spirit and scope of the invention are intended to be included within the scope of the appended claims.

What we claim as new and desire to secure by Letters Patent of the United States, is:

1. A two-speed synchronous motor mechanism comprising a secondary member provided with two sets of salient pole pieces, the number of pole pieces in one set being an even multiple of the number in the other set, and unitary primary means for producing a similar alternating magnetic field through either of said sets of pole pieces.

2. A two-speed self-starting synchronous motor mechanism comprising a secondary member having a single unitary induction motor secondary element and two sets of salient magnetic poles located thereon, the number of poles in the two sets being different, and stator means for producing an alternating shifting magnetic field through said induction motor secondary element and either set of said salient poles.

3. A synchronous motor mechanism for producing a plurality of synchronous speeds, comprising a single unitary rotor element provided with different sets of salient magnetic poles, the different sets of poles being displaced from each other along the axis of rotation of the rotor, and the number of poles in the different sets being different, a unitary, shaded pole, single phase stator means for producing a pulsating magnetic field through said rotor, and means for moving said stator and rotor elements relative to each other in the axial direction of said rotor to cause the stator flux to act upon a selected set of salient poles.

4. A multiple speed synchronous motor mechanism having a rotor member comprising a tube of magnetic material having at least two sets of axially displaced salient poles cut therein, the number of poles in different sets being different, a stator member for producing an alternating magnetic flux through said motor, and means for moving the stator so as to select the set of salient rotor poles which will be acted upon by the flux.

5. A multiple speed self-starting cynchronous motor mechanism comprising a rotor having a single integral portion serving as the secondary of an induction motor and at least two axially displaced sets of salient magnetic poles thereon, a stator member provided with means for producing a shifting alternating flux through said rotor, and means for moving the stator element adjacent to any set of said salient magnetic poles.

6. A multiple speed synchronous motor comprising relatively rotatable primary and secondary elements, the secondary member being provided with a plurality of sets of salient magnetic poles, the number of poles in the different sets being different, the primary member being provided with means for producing alternating fluxes through the secondary element, causing synchronous operation of said motor mechanism, and relay means for shifting the stator for selectively determining the set of salient magnetic poles of the secondary which are influenced by the stator fluxes.

7. A multiple speed synchronous motor mechanism comprising a disc rotor secondary provided with a plurality of concentric rows of salient magnetic poles, the number of poles in the different rows being different, a shaded pole stator primary member for each row of said salient poles having flux producing pole tips adjacent to the corresponding row of salient poles of the disc, and means for selectively energizing any one of said stator elements.

8. A multiple speed self-starting synchronous motor comprising an induction disc rotor having a series of concentric rows of salient magnetic poles thereon, a single phase shaded pole primary stator element for each row of rotor poles, different stator elements being positioned adjacent different rows of rotor poles so as to produce fluxes therein and the adjacent portion of the disc to produce synchronizing and starting torques, respectively, and means for selectively energizing any one of said stator elements.

9. A multiple speed self-starting synchronous motor mechanism having a secondary member providing at least two alternate paths for the motor operating flux therethrough, a single unitary induction motor secondary element in both flux paths, stator means for producing the motor operating fluxes, means for selectively determining which of said alternative flux paths the operating fluxes shall take, and means included in said different paths for determining the synchronous speed of the mechanism.

10. A multiple speed synchronous motor mechanism provided with a single phase, shaded pole stator member for producing the motor operating fluxes, a rotor upon which said fluxes operate, means for changing the path of the stator fluxes through the rotor, said rotor being designed to operate at different synchronous speeds dependent upon the different paths which the stator fluxes take therethrough.

MAX LILIENTHAL.
LOTHAR MICHAELIS.